(No Model.) 6 Sheets—Sheet 1.

M. H. PEARSON & C. BENNION.
PUNCHING AND EYELETING MACHINE.

No. 396,890. Patented Jan. 29, 1889.

(No Model.) 6 Sheets—Sheet 5.

M. H. PEARSON & C. BENNION.
PUNCHING AND EYELETING MACHINE.

No. 396,890. Patented Jan. 29, 1889.

(No Model.) 6 Sheets—Sheet 6.
M. H. PEARSON & C. BENNION.
PUNCHING AND EYELETING MACHINE.

No. 396,890. Patented Jan. 29, 1889.

UNITED STATES PATENT OFFICE.

MARSHALL HENRY PEARSON AND CHARLES BENNION, OF LEICESTER, COUNTY OF LEICESTER, ENGLAND.

PUNCHING AND EYELETING MACHINE.

SPECIFICATION forming part of Letters Patent No. 396,890, dated January 29, 1889.

Application filed April 24, 1888. Serial No. 271,711. (No model.) Patented in England September 17, 1885, No. 11,041, February 13, 1886, No. 2,113, January 5, 1887, No. 149, and January 28, 1888, No. 1,317.

*To all whom it may concern:*

Be it known that we, MARSHALL HENRY PEARSON and CHARLES BENNION, subjects of the Queen of Great Britain and Ireland, residing at Leicester, in the county of Leicester, England, have invented certain new and useful Improvements in Punching and Eyeleting Machines, (for parts of which Letters Patent have been granted in England to the said MARSHALL HENRY PEARSON, No. 11,041, dated September 17, 1885, and No. 2,113, dated February 13, 1886; also to the said MARSHALL HENRY PEARSON and CHARLES BENNION, No. 149, dated January 5, 1887, and for which provisional protection has been granted to the said parties, No. 1,317, dated January 28, 1888,) of which the following is a specification.

This invention relates to improvements in punching and eyeleting machines such as are used in the boot and shoe trade for perforating and eyeleting the uppers of boots or shoes; and the objects of these improvements are, first, to provide means whereby a boot-upper may be punched and eyeleted simultaneously, or each operation may be performed separately, on the same machine; second, to provide means for supplying a regular supply of eyelets to the clinching mechanism, and, third, to reduce the friction in moving the chute to and from its work. We attain these objects by the mechanism illustrated in the accompanying drawings, in which—

Similar letters refer to like parts throughout the several views.

The standard A, its pillar B, and legs C constitute the frame-work of the machine. In the bosses $a$ $a'$ slides the spindle D, carrying the eyelet-clinching die $d$, and to the upper end of the former is attached, between the collars $d'$, the bifurcated end $d^2$ of the bent portion of the connecting rod or lever $d^3$, which rod or lever is connected at its opposite or straight end to the treadle referred to hereinafter.

Figures 2, 5, 8, 13, 14:
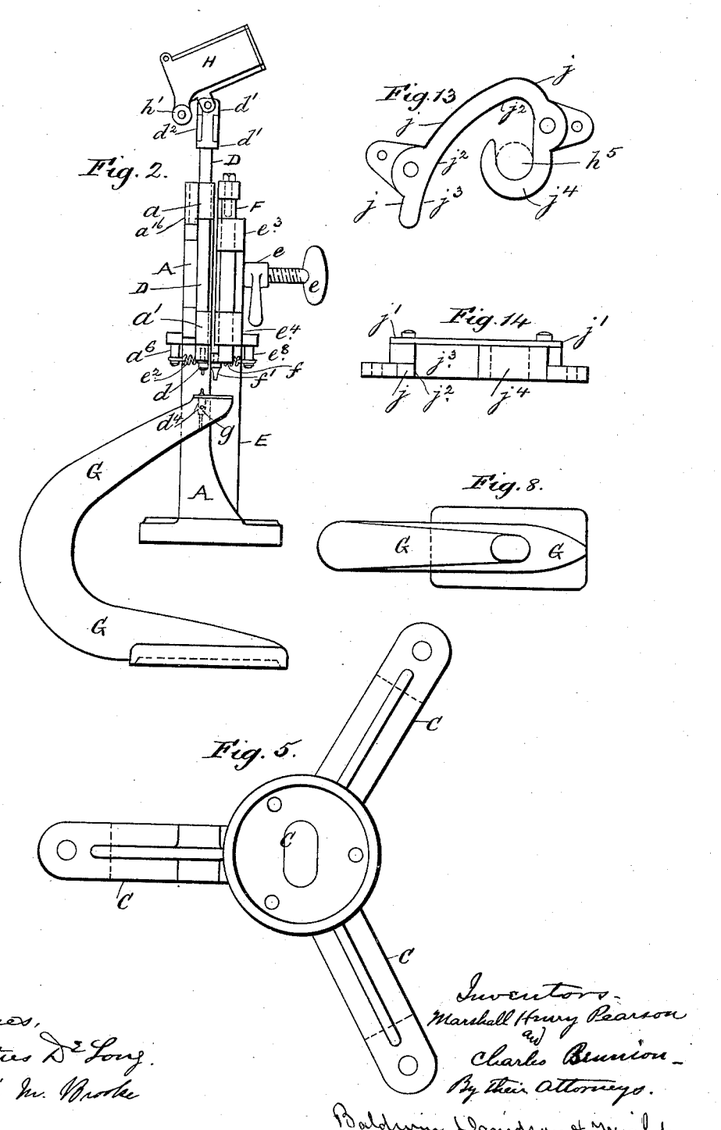
Fig. 2, a part front elevation with stand and treadle arrangement removed.
Fig. 5, a plan of the lower part of the stand as it appears after the pillar has been removed.
Fig. 8, a plan of work-supporting horn.
Figs. 13 and 14, an elevation and a plan (with cover removed) of eyelet-controlling device.
Figure 27:
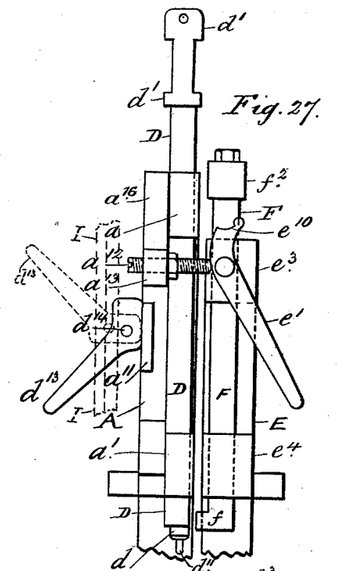
Figs. 27 and 28 are a side elevation and front elevation of device for increasing the distance between the punching and eyeleting spindles.
Figure 28:
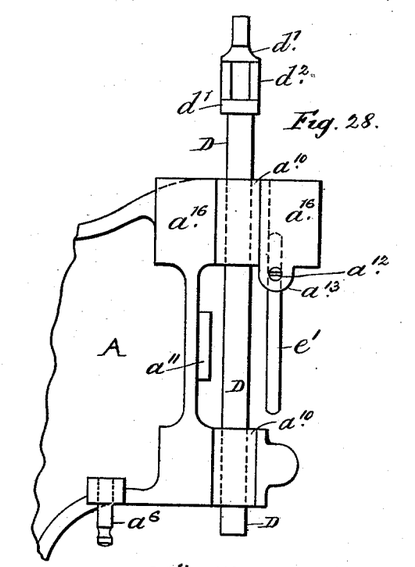

To the standard A is mounted and hinged at $a^2$ $a^3$ a second and smaller standard or framing, E, carrying the punching mechanism, in such a manner that the distance between the punch and eyelet-clinching tools can be readily adjusted by the regulating-screw and lock-nut $e$, Fig. 2, as well as by the lever arrangement $e'$, Fig. 27. The two standards A and E are retained in relative positions to each other by a spiral spring, $e^2$, attached to the pins $a^6$ and $e^8$. In the bosses $e^3$ $e^4$ slides the spindle F, carrying a punching-tool, $f'$, of ordinary construction, and to the upper end of the former is attached, by a set-screw, the bent portion of the connecting rod or lever $f^2$, which is coupled at its opposite end to the treadles referred to hereinafter. The connecting-rods $d^3$ and $f^2$ are made to work, respectively, in the vertical recesses $a^4$ and $e^5$, formed in the standards A and E, Fig. 7, and are retained in position by the plates $a^5$ and $e^6$, Set-screws $a^7$ and $e^7$ are provided for regulating the stroke of the rods or levers $d^3$ and $f^2$.

Figures 1, 3, 4, 6:
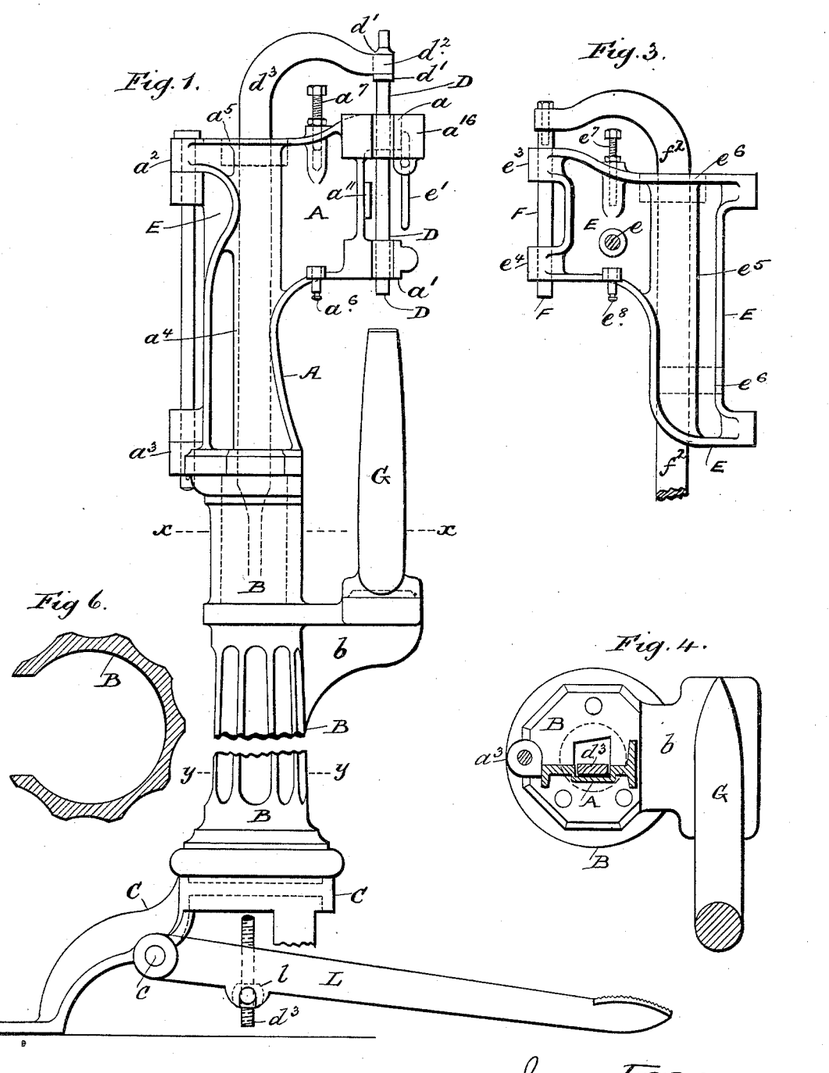
Figure 1 is a side elevation of entire machine.
Fig. 3, a side elevation of framing for carrying the punching mechanism.
Fig. 4, a part plan on line $x$ $x$, Fig. 1.
Fig. 6, an enlarged section on line $y$ $y$, Fig. 1.
Figure 29:
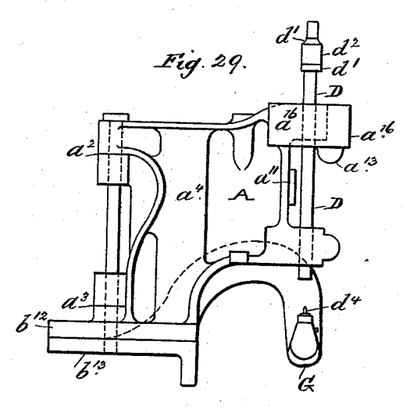
Figs. 29, 30, and 31 are a side elevation, front elevation, and plan of work-supporting horn adapted for a machine to be fixed on a bench.
Figure 30:
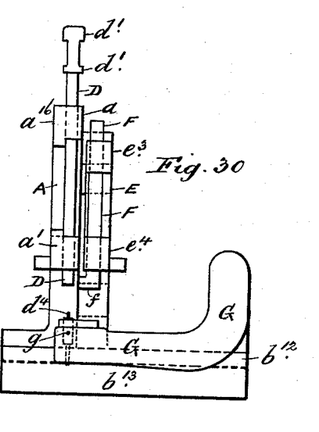
Figure 31:
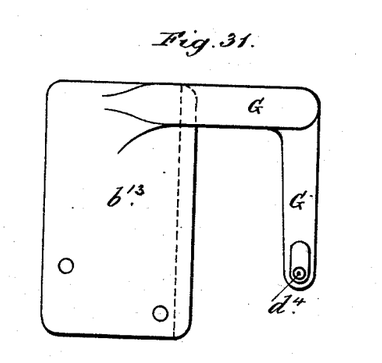

The spindles D and F are preferably mounted in their bosses out of center, and the spindle F is also provided with the elongated end $f$, in which the punching-tool is fixed, so as to permit of the latter and the eyelet-clinching tool working closely together; but when holes of two different pitches are required to be punched in a boot-upper the distance between the two spindles may be instantly increased by means of the lever device shown at Fig. 27, which consists of pivoting the lever $e'$ to the boss $e^3$ of the standard E, and when it is desired to increase the pitch of the holes the lever is raised, which causes its cam-shaped end to operate against the end of an adjustable screw, $a^{12}$, (carried by the lug $a^{13}$ of the standard A,) until the recessed end $e^{10}$ impinges on the end of the screw. The distance between the two spindles may be readily adjusted by the screw $a^{12}$. To the bracket $b$ of the pillar B is bolted the work-supporting horn G, which is curved, as shown, to make room for the boot or shoe upper to be passed under the punching and eyeleting tools. In the upper portion of the horn, centrally with the spindle, is the fixed clinching eyeleting-die $d^4$. This die may be vertically adjusted in the horn, and may be retained after adjustment by a set-screw, $g$. In some cases, when the machine is required to be fixed to a bench instead of a pillar, B, as shown at Fig. 1, the horn may be shaped as shown at Figs. 29, 30, and 31, and cast to the same foundation-plate, $b^{13}$, as the eyeleting-standard A is screwed. The foundation-plate $b^{12}$ is bolted to a sole-plate, $b^{13}$, which is fixed to the bench. To the seating or projection $a^{16}$ is secured the bracket $h$, to which is hinged, at $h'$, the self-feeding mechanism for supplying the eyelets to the clinching device referred to hereinafter.

The means we employ for arranging, regulating, and conveying the eyelets to the clinching-dies consists of a square or rectangular flat-bottomed box, (with or without the hinged lid $h^3$,) hinged to the bracket $h$ by means of a pin, $h^2$. To the latter is also hinged a vertical chute, I, in such a manner that an intermittent reciprocating motion may be imparted to these parts from the spindle D, either separately or simultaneously, as hereinafter described.

Figures 7, 9, 10, 11, 12, 15, 16, 17:
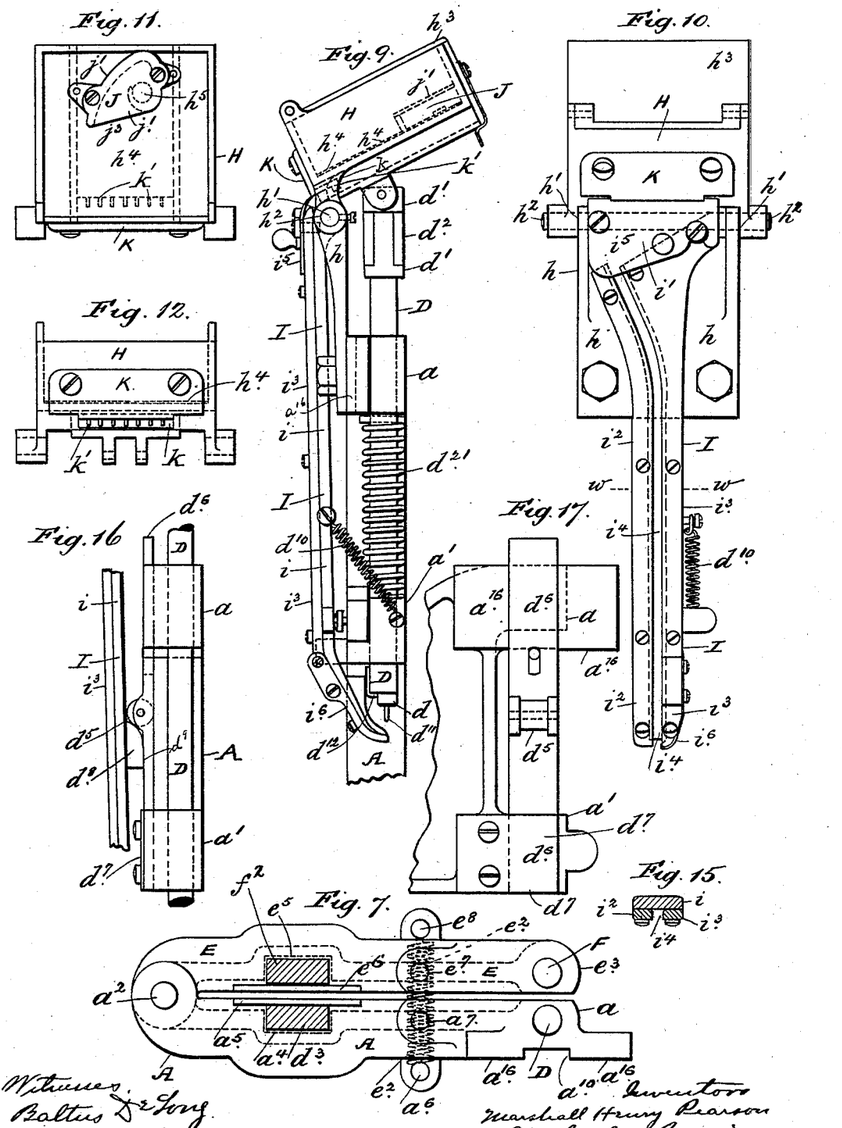
Fig. 7, a part plan of machine, looking at the top.
Figs. 9 and 10 are respectively a side and front elevation of self-feeding eyeleting mechanism.
Figs. 11 and 12 are respectively a plan (with lid removed) and a front elevation of eyelet-box.
Fig. 15, a cross-section of eyelet-chute on line $w$ $w$, Fig. 10.
Figs. 16, 17, 18, 19, 20, and 21 are respectively enlarged side and front elevations of mechanism for actuating the chute.

The box H, reciprocated by the spindle D, and shown at Figs. 9, 10, 11, and 12, is divided into two compartments, the lower one being preferably, though not necessarily so, made narrower and shallower than the upper one. Over the lower compartment is secured a plate, $h^4$, which forms the bottom of the upper compartment, and communication between the two portions is obtained by means of a hole, $h^5$, formed in the plate $h^4$, slightly out of center and near the rear end of the box, as shown at Figs. 9 and 11. This hole is covered by a shield, J, made in two parts—viz., a conducting portion or guide, $j$, a little deeper than the length of the eyelets and shaped somewhat similar to a nautilus shell, (see Fig. 13,) and a cover, $j'$, secured to the upper portion of the guide $j$. (See Fig. 14.) The guide $j$ is placed with its mouth $j^3$ facing the front of the box, and it is employed for regulating the passage and supply of eyelets from one compartment to the other.

To the front of the previously-referred-to box H is secured an angular plate, K, which, after being secured to the front of the box, is bent at a right angle thereto, so as to pass through the slit or opening $k$ into the lower compartment, parallel with and immediately under the plate $h^4$, until it is turned down at right angles to form a guide plate or comb across the lower compartment and nearly its full depth. In this guide-plate $k'$ is cut or formed a number of holes or recesses of the same shape as the eyelets, and so arranged that the latter can only pass under and through this plate to the chute with their barrels uppermost. In some cases this angle-plate may be dispensed with, and openings or perforations of the shape of the eyelets may be cut or formed in the end of the box; but we prefer using the angle-plate, as we find the eyelets pass more regularly to the chute when there is a short distance between the plate $k'$ and hinge $h'$.

The chute I, previously referred to, and shown at Figs. 9 and 10, is provided at its upper hinged end with a hopper, $i'$, for receiving the eyelets as they pass from the lower compartment of the box H. The chute is bent at its free or delivery end to pass between the clinching-dies. To the back or body $i$ of the chute is secured the guiding-plates $i^2$ $i^3$, placed at a suitable distance apart, so as to form a channel, $i^4$, down which the barrel of the eyelet slides on its way to the clinching-dies, while the flanges of the eyelets impinge and slide down the body $i$. That part of the inner edge of each guide-plate $i^2$ $i^3$ nearest the body $i$ is well rounded off, so as to provide a free and clear passage for the eyelets down the channel $i^4$. The portion of the chute which works on the pin $h'$ is made concentric therewith and forms a hinge with the lower compartment of the box H. These two parts are so arranged that whatever position the box and chute assume as regards each other the upper surface of the lower compartment is at a tangent with the periphery of the hinge. The outer portion of the hopper is formed by a removable plate or covering, $i^5$, having its upper end made concentric with the hinge. The upper portion of the guide-plate $i^3$ is inclined, as shown at Fig. 10, to aid in conducting or directing the eyelets to the channel. A spring, $i^6$, is secured to the lower end of the chute to prevent the eyelets from escaping therefrom, except when acted upon by the nipple $d^{11}$ and spindle D.

Figure 18:
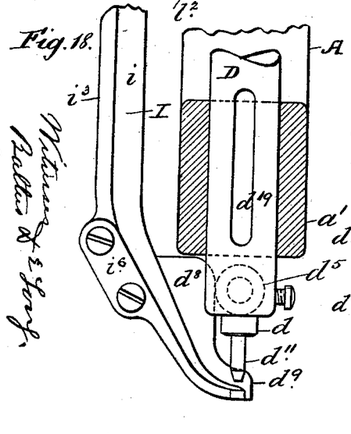
Figure 19:
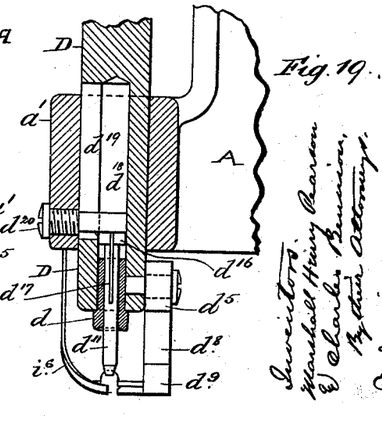

The chute I is intermittently reciprocated by the spindle D, to allow the latter to perform the clinching operation. This movement of the chute is obtained by a roller, $d^5$, fixed to the spindle D, (see Figs. 18 and 19,) or carried by a separate plate, $d^6$, (see Figs. 16 and 17,) which is operated by a pin attached to the spindle D. When the latter device is adopted, the plate $d^6$ is made to work in the recesses $a^{10}$, Fig. 7, in the standards A, and held in that position by a flat spring, $d^7$. The roller $d^5$ acts upon a cam or projection, $d^8$, secured to the body $i$ of the chute, either at the free bent end, as shown at Figs. 9, 18, and 19, or else near the center, as shown at Fig. 16. When the cam-piece $d^8$ is placed near the bent delivery end of the chute, it is so shaped that as the spindle moves downward the roller will slide upon the face without moving the chute. As soon as the nipple $d^{11}$ enters the eyelet (retained in the end of the chute by the spring $i^6$) the roller is timed to come in contact with the lower projecting portion, $d^9$, of the cam and push the chute on one side clear of the spindle until the clinching operation has been completed. When the clinching operation has been performed, the spindle D commences to rise and the projecting portion $d^9$ remains in contact with the roller $d^5$ until the lower end of the spindle has risen clear of the free delivery end of the chute. Then the roller passes on to the parallel portion of the cam and allows the chute end to again pass under the nipple. The spring $d^{10}$ is employed for retaining the cam in contact with the roller.

Figure 20:
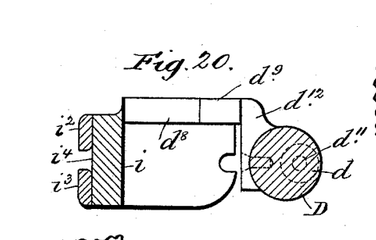
Figure 21:
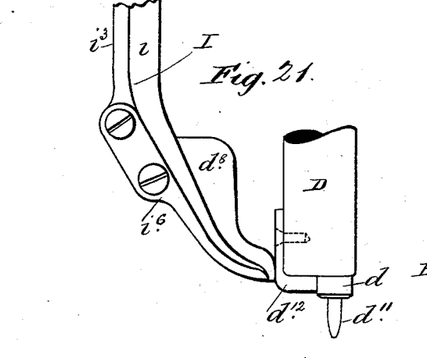

When the eyelet-clinching die $d$ and nipple $d^{11}$ are fixed in the spindle out of center, as shown at Figs. 9, 20, and 21, for the purpose of punching and eyeleting holes much closer together, and at distances suitable for the uppers of ladies' and children's boots and shoes, we use a projection, $d^{12}$, in place of the roller $d^5$. This projection is fixed to the spindle D and acts upon the previously-referred-to cam $d^8$ in the manner described.

The chute I may be thrown in and out of action by means of a cam-lever, $d^{13}$, Fig. 27, which is pivoted at $d^{14}$ to the chute. When the end $d^{15}$ is made to act upon the lug or projection $a^{11}$ of the standard A, as shown in dotted lines, Fig. 27, the cam $d^8$ and roller $d^5$ are disengaged.

The eyelet-clinching device consists of an upper die, $d$, secured to the spindle D, and a lower die, $d^4$, secured in a recess in the horn G, as previously explained. The upper die, $d$, which is inserted in a hole, $d^{18}$, bored up the spindle D, (see Fig. 19,) is provided with a hole through its center to form a bearing for the nipple $d^{11}$. The nipple is provided with a head, $d^{16}$, of a rather less diameter than the hole $d^{18}$. In order to dispense with the spiral spring which usually acts on the nipple, a slit, $d^{17}$, is cut in the latter from the head downward to about one-half its length. The split portion is sprung open, so that it will impinge and hold by friction against the walls of the hole in the die and by the head in the hole $d^{18}$ of the spindle. In the spindle is also formed or cut a slot-hole, $d^{19}$, through which is passed at right angles to the spindle a pin, $d^{20}$, fixed in the bearing $a'$. This pin is employed to prevent the nipple from rising with the spindle to the full extent of the stroke of the latter. As soon as the head of the nipple comes in contact with the pin $d^{20}$ the former remains stationary, while spindle continues its upward motion, thereby forcing the free end of the nipple outward, ready to receive the eyelet (at the end of the chute) on the return or downward stroke of the spindle. The nipple after passing through the eyelet remains in this outward position until its free end has passed through the eyelet and is brought in contact with the lower die, $d^4$. It is then forced with the die $d^{11}$ and spindle, and rests there until again acted upon by the pin $d^{20}$, as described. By this means the danger of the end of the chute coming in contact with the nipple is removed.

Figure 22:
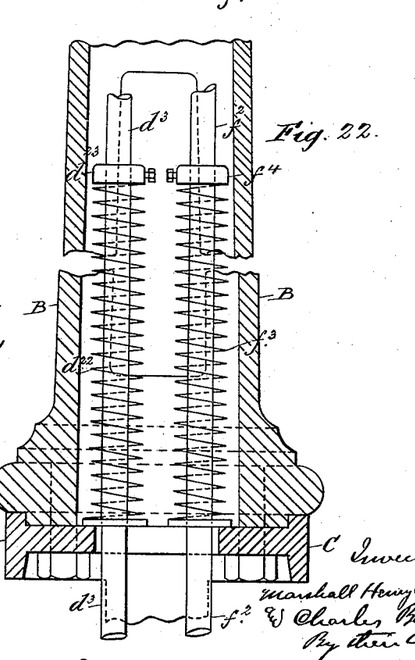
Fig. 22, mechanism for returning the treadles to their original position.
Figure 23:
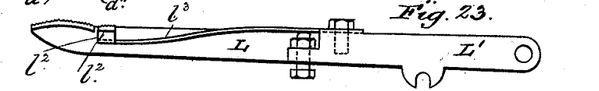
Figs. 23, 24, 25, and 26 are respectively elevations and plans of the treadles, Figs. 25 and 26 being drawn to a larger scale than Figs. 23 and 24.
Figure 24:
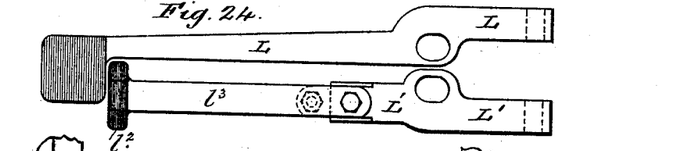
Figure 25:
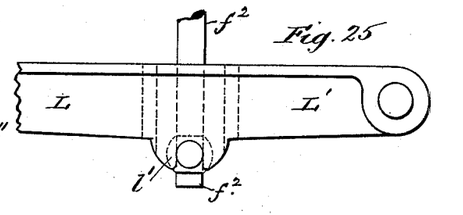
Figure 26:
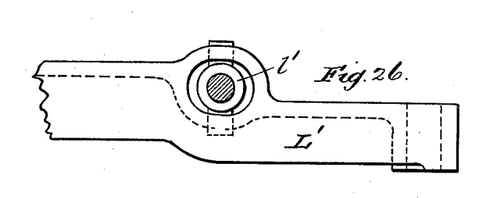

L L' are the treadles for operating, respectively, the spindles D and F through the rods $d^3$ and $f^2$. The treadles are pivoted to the legs C at $c$, and connected to the screwed portion of the rods $d^3$ and $f^2$ by trunnion-nuts $l$ $l'$, whereby the stroke of the said spindles can be readily adjusted. To provide for any inaccuracy in the working of the two treadles, the foot-plate $l^2$, Fig. 23, of the lever L', which operates the punch, is secured on one end of the flat spring $l^3$, while its opposite end is fixed to the lever L', as shown at Figs. 23 and 24, thereby permitting the foot-plate to be depressed with the treadle L without acting upon the punching-spindle F. In order to raise the treadles after each operation to their normal position, spiral springs $d^{21}$ $d^{22}$ $f^3$, Figs. 9 and 22, may be employed. To adjust the position of the springs $d^{22}$ and $f^3$ on the rods $d^3$ and $f^2$, movable collars $d^{23}$ and $f^4$ are employed, which are held in position by set-screws, as shown. Spring $d^{21}$ is made to encircle the spindle D.

The action of the machine for punching and eyeleting boot or shoe uppers is as follows: After the chute has been thrown out of action by the cam-lever $d^{13}$, the box H (the upper compartment of which has been previously filled, or nearly so, with eyelets) is reciprocated or tilted by the treadle L, through rod $d^3$ and spindle D, until the channel in the chute is filled with eyelets. During the tilting operation each time the rear or free end of the box is depressed the bulk of the eyelets will be thrown to that end of the box, and one, two, or more of the eyelets will enter the mouth of the guiding-shield J. The eyelets, after entering the shield, are passed round to the curved part $j^2$, ready to be thrown forward when the box is returned to the position shown in the drawings. As these eyelets are thrown forward toward the hinge, they are prevented from passing beyond the hole $h^5$ in the floor $h^4$ of the upper compartment by means of the semicircular end $j^4$ of the shield that partially surrounds the hole, and are thus passed from one compartment to the other. After the eyelets have been passed through the hole $h^5$ they are again shaken and turned over in the lower compartment by the continued tilting operations until their flanges rest flat upon the inner surface of the lower compartment. When in this position, they slide forward and issue through the apertures in the plate $k'$, and through the opening $k$, over or round the hinge $h'$, into the hopper $i$, and from thence down the channel $i^4$ to the delivery end of the chute I. After the chute has been filled with eyelets the tilting of the box at each clinching operation will keep the chute constantly supplied. As the eyelets pass over the curved or bent portion of the free end of the chute they are reversed, so as to be delivered to the clinching-dies with their flanges uppermost. It will be readily observed that by having the chute circular or curved at both ends the eyelets are completely turned during their passage from the lower compartment of the box to the clinching-dies, while their flanges are kept in contact with the body or foundation plate $i$ of the chute until they reach its delivery end. When the chute has been returned to the position shown in the drawings, we commence at the "vamp" of the upper and punch a hole by depressing the treadle L'. Then the upper is passed to the left hand until the hole just punched is passed over the fixed eyeleting-die $d^4$ in the horn G. This hole is then eyeleted and a second one punched by depressing both treadles at the same time, whereby the spindles of both machines are operated simultaneously and the eyelets also supplied to the machine, as herein described. Each hole after being punched is passed over the fixed eyeleting-die and the eyeleting and punching operations continued until the last hole is punched, when this hole is eyeleted by depressing treadle L.

In conclusion, we are aware that prior to our invention separate machines for punching and eyeleting boot or shoe uppers have been made with vertically-sliding spindles operated by fulcrumed levers; also, that Letters Patent have been granted in England to William Robert Lake, (a communication from Mellen Bray, of Boston and Newton, Massachusetts, United States,) No. 100, dated January 12, 1875, and No. 2,333, dated June 9, 1880, in the specifications of which a tilting box hinged to a chute is employed for supplying and conducting a special kind of rivet (used in the boot trade) to a cylinder to be drilled, and also to a fixing-machine. We therefore do not claim such combinations, broadly; but What we do claim as our invention, and desire to secure by Letters Patent, is—

1. The combination of the standard A, the frame E, hinged thereto, the punching-tool and eyelet-clinching die mounted on shafts or spindles reciprocating in the standard A and hinged frame E, the spring for holding together the standard A and frame E, and means for opening and adjusting the distance between the standard A and frame E, substantially as set forth.

2. In a punching and eyeleting machine, the combination of a standard, A, having a vertical eyelet-clinching spindle sliding in bearings on said standard, mechanism, substantially as described, for actuating said spindle, and a work-supporting horn, G, with a pillar, B, (mounted on legs C,) adapted to connect the said standards together and retain them in their respective positions to each other, substantially as set forth.

3. In a punching and eyeleting machine, the combination of a standard, A, secured to pillar B, a vertical sliding spindle, D, adapted to slide in bearings on said standard and operated by mechanism, as described, with a flat-bottomed radial reciprocating eyelet-box divided into two compartments and hinged to a supporting-bracket secured to said standard, a vertical hopper-ended conducting-chute hinged to said supporting-bracket and box, and mechanism, substantially as described, adapted to actuate and reciprocate the box and chute simultaneously or separately, as set forth.

4. In a punching and eyeleting machine, the combination of the standard A, secured to the pillar B, the vertical spindle adapted to slide in bearings on said standard, the self-feeding eyelet-box and chute, operating mechanism, substantially as described, and work-supporting horn, with an adjustable framing, E, having bearings at one end adapted to receive a vertical sliding spindle carrying the punching-tool and hinged at the other end to the said standard, and the mechanism, substantially as set forth, for adjusting and increasing the distance between the spindles carrying the eyelet-clinching and punching tools, as set forth.

5. In a punching and eyeleting machine, the combination of the standard A, secured to the pillar B, mounted on legs C, the vertical spindle D, carrying the upper clinching-die, adapted to slide in bearings on said standard, the work-supporting horn G, the self-feeding eyelet-box H, chute I, and frame E, hinged at one end to said standard and provided at the other end with bearings to receive the vertically-sliding spindle F, carrying the punching-tool $f$, with the treadles L L', pivoted to the legs C, and intermediate mechanism, substantially as described, connecting said parts to the spindles D and F, whereby the latter may be operated, as set forth.

6. In a punching and eyeleting machine, the combination of the pillar mounted on legs adapted to receive the treadles, the standard adapted to be secured to said pillar and to receive the sliding spindle carrying the upper eyelet-die, and the framing adapted to be hinged at one end to said standard and at the other to receive the vertical sliding spindle carrying the punching-tool, and intermediate mechanism, as described, connecting said spindles to the treadles, whereby either spindle may be operated by its respective treadle, the other at the same time being inoperative, or both operated simultaneously, as set forth.

7. The combination of spindle D, eyelet-box H, divided into two compartments and hinged to a support, $h$, guiding-shield J, angle-plate K, chute I, hinged to said support and eyelet-box, hopper $i'$, guiding-plates $i^2 i^3$, covering-plate $i^5$, spring $i^6$, cam-lever $d^{13}$, projection $a^{13}$, against which said cam-lever operates, cam $d^8$, and roller $d^5$, all substantially as set forth.

8. The combination of standard A, pillar B, frame E, lever $e'$, screw $a^{12}$, spindles D and F, nipple $d^{11}$, adjusting-screw $e$, pins $a^6$ and $e^8$, and spring $e^2$, whereby the said spindles are adjusted and retained at the required distance apart, as set forth.

9. The combination of the standard A, bearings $a$ $a'$, slotted spindle D, upper die, $d$, secured in said spindle, headed and slit nipple $d^{11}$, and pin $d^{20}$, with which said nipple engages, all substantially as set forth.

10. The combination of standard A, slotted spindle D, sliding in bearings on said standard, upper die, $d$, nipple $d^{11}$, pin $d^{20}$, hinged chute I, spring $d^{10}$, cam $d^8$, secured to the chute, and roller $d^5$, adapted to engage with said cam, all substantially as set forth.

11. The combination, with a punching and eyeleting machine, of the treadles L L', pivoted to the legs C', said treadle L' being partially composed of a flat spring, $l^3$, rods $d^3$ and $f^2$, trunnion-nuts $l$ $l'$, springs $d^{21}$, $d^{22}$, and $f^3$, and spindles D and F, all substantially as set forth.

In testimony whereof we have signed our names to this specification in the presence of two subscribing witnesses.

MARSHALL HENRY PEARSON.
  CHAS. BENNION.

Witnesses:
  WM. BRAMLEY,
  EDMUND CLAY, Jr.